May 25, 1943.   P. E. CHAPMAN, SR   2,320,264
WIRE TENSIONING DEVICE
Original Filed Oct. 1, 1938
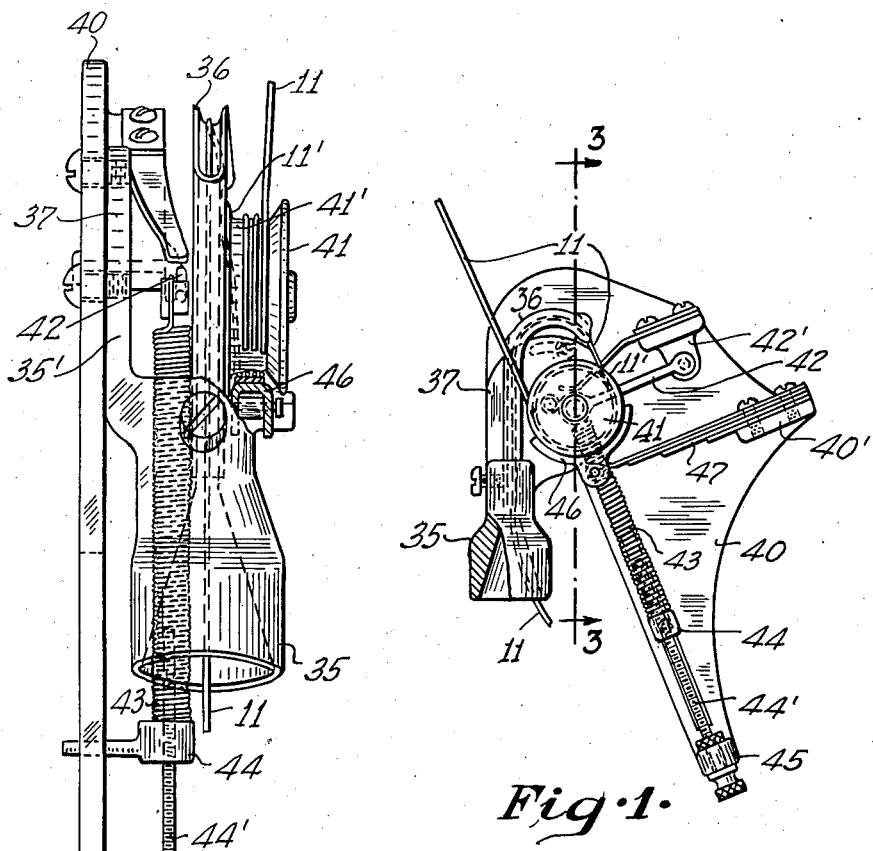
Fig·1·
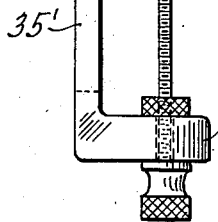
Fig·2·
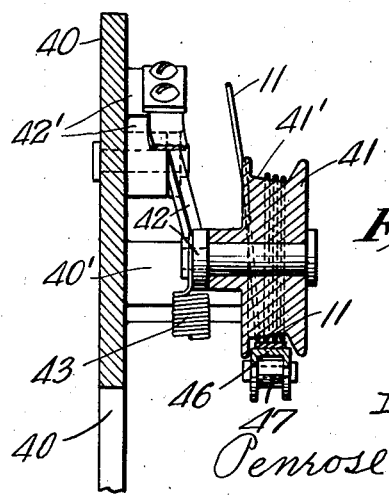
Fig·3·
INVENTOR
Penrose E Chapman Sr.

Patented May 25, 1943

2,320,264

UNITED STATES PATENT OFFICE 2,320,264

WIRE TENSIONING DEVICE

Penrose E. Chapman, Sr., St. Louis, Mo.

Original application October 1, 1938, Serial No. 232,715, now Patent No. 2,242,053, dated May 13, 1941. Divided and this application January 21, 1941, Serial No. 375,315

3 Claims. (Cl. 242—155)

This application is divided out of my application No. 232,715, series of 1935, filed October 1, 1938, now Patent No. 2,242,053, dated May 13, 1941.

The object of my invention is applying an automatic compensated tension to wire so that the final or delivered tension shall be practically uniform.

I accomplish this object as hereinafter described.

The term "wire" is herein used to include any elongated material as cordage, wire, ribbon, et cetera, made of any material.

In the drawing

Fig. 1 is a general front elevation of my automatic tension device.

Fig. 2 is a left edge elevation of the said automatic tension device.

Fig. 3 is a vertical sectional view taken approximately on the plane indicated by the line 3—3 of Fig. 1.

The accomplishing of my object to deliver wire under uniform tension requires that any tensioning device be self-adjusting, like a governor, and compensate for the irregularities of tension in the wire as fed to said device and those caused by erratic demand.

To provide the tension I movably mount a capstan pulley 41 upon a crank 42. The shaft of this crank is supported in the bearing 42' in the frame 40. By "capstan pulley" is meant one simulating or derived from the well-known ship capstan, having a convex or straight-tapered tread about which one or more convolutions of the wire or filament intermediate the ends thereof are wound, which tread, because of its taper, causes the convolutions to continuously slip axially thereon toward the smallest diameter as the one end portion of the wire is withdrawn from and the other end portion is supplied to the tread. The tread 41' of the capstan pulley may be of any conventional pattern but I prefer it tapered in the usual manner.

A brake shoe 46 is arranged to act against the tread of said capstan pulley. Said shoe is shown in section in Fig. 2. This brake shoe is flexibly mounted as by the brake shoe spring 47 that is conveniently attached to the lug 40' of the frame 40.

The capstan pulley 41 is pressed against said brake shoe 46 by the tension spring 43 which has one end attached to crank 42 and the other through any convenient adjusting means as nut 44 and screw 44' to the bracket 45 carried by the frame 40.

In action the wire 11 emerges from the apex 35 through the wire directing guide 36 and is deposited by it upon the high side of the capstan pulley tread at 11', then wraps around said pulley and leaves the lower side of the tread approximately in the direction of the motion of said pulley. With this arrangement the wire is gripped between the brake shoe 46 and the tread 41' of the capstan pulley as shown in section in Fig. 2 thus supplying the friction or drag necessary in applying a tension to said wire. As the wire 11 slips down the tread 41' of the capstan pulley in the usual manner it also slips across the face of the brake shoe and thereby avoids wearing serious grooves therein.

The automatic regulation or governing of the tension is accomplished as follows: As stated the capstan pulley is pressed against the brake shoe by the spring 43. The direction of the pull of the wire going to and leaving the pulley is opposed to the action of said spring upon said pulley so that as the tension on either or both the entering or leaving wire increases it tends to neutralize more or less the tension of said tension spring and retract or pull said pulley away from said brake shoe, thus easing off or releasing the braking action of the said brake shoe. When tension on wire decreases obviously the reverse action occurs.

There may be many modifications of the physical structure I have used to disclose this one of my inventions that may be used without departing from said invention, therefore as my invention I wish to claim:

1. In a device for automatically controlling the tension on a filament or the like being continuously withdrawn from a source of supply, a rotatably mounted wheel having an axially tapering tread about which the filament is helically trained; and a brake member engageable with the filament to press it against the wheel tread, at least one of the elements being yieldably mounted to provide tension-responsive pressure between the brake member, filament and wheel tread, and the taper of the tread effecting axial slippage of the filament thereon toward the smaller diameter as said filament is supplied to and withdrawn from the tread, whereby the filament is moved across the face of the brake member to distribute the wear thereon.

2. In a device for automatically controlling the tension on a filament or the like being continuously delivered from a source of supply, a rotatable capstan wheel to which the filament is continuously supplied and from which it is continuously withdrawn, said wheel having an axially tapered tread about which convolutions of the filament are trained; a brake shoe mounted for engagement with said convolutions; and means responsive to variations in the tension upon the filament for causing variable pressural engagement between the brake shoe and convolutions to cause the shoe to continuously press the convolutions against the wheel tread and to resist rotation of the wheel; the taper of the tread producing axial movement of the convolutions thereon as the filament is supplied to and withdrawn from the same, whereby the convolutions are moved across the face of the shoe and localized wear of the latter prevented.

3. A device for automatically controlling the tension on a filament or the like being continuously delivered from a source of supply, comprising a rotatable capstan wheel having an axially tapering tread, to a larger diametral portion of which the filament is continuously fed and from a smaller diametral portion of which it is continuously withdrawn, with convolutions encircling the tread between said portions; a brake shoe mounted for engagement with said convolutions; and yielding means for causing pressural engagement between the brake shoe, filament convolutions and wheel tread to resist rotation of the convolutions and wheel, said means being responsive to variations in the tension upon the filament to vary the pressure between the shoe, convolutions and tread accordingly; the taper of the wheel tread causing axial slippage of the convolutions thereon as the filament is supplied to and withdrawn from the same, whereby the convolutions are moved transversely across the face of the shoe and localized wear of the latter is prevented.

PENROSE E. CHAPMAN, Sr.